US009505434B2

(12) United States Patent
Lavoie et al.

(10) Patent No.: US 9,505,434 B2
(45) Date of Patent: Nov. 29, 2016

(54) TRAILER BACKUP ASSIST SYSTEM WITH NORMALIZED STEERING INPUT DEVICE FOR DIFFERENT TRAILERS

(71) Applicant: Ford Global Technologies, LLC, Dearborn, MI (US)

(72) Inventors: Erick Michael Lavoie, Dearborn, MI (US); Bradley G. Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 14/447,102

(22) Filed: Jul. 30, 2014

(65) Prior Publication Data

US 2014/0343793 A1   Nov. 20, 2014

Related U.S. Application Data

(63) Continuation-in-part of application No. 13/336,042, filed on Dec. 23, 2011, now Pat. No. 8,972,108.

(60) Provisional application No. 61/477,136, filed on Apr. 19, 2011.

(51) Int. Cl.
   *B62D 13/06* (2006.01)
   *B62D 13/00* (2006.01)
   (Continued)

(52) U.S. Cl.
   CPC ........ *B62D 13/06* (2013.01); *B60W 30/18036* (2013.01); *B62D 13/00* (2013.01);
   (Continued)

(58) Field of Classification Search
   CPC .. G08G 1/168; B60R 1/00; B60R 2300/105; B60R 11/04; B60R 2300/202; B60R 2300/301; B60R 2300/302; B60R 2300/303; B60R 2300/304; B60R 2300/60; B60R 2300/607; B60R 2300/802; B60R 2300/806; B60R 2300/8086; B62D 15/027; B62D 15/0275; B62D 15/0285; B62D 13/06; B62D 13/00; B62D 13/005; H04N 5/232; H04N 5/23206; H04N 5/2628; H04N 9/735; H04N 9/07; H04N 7/181; G03B 29/00; E02F 9/0841; G06K 9/00791; B60W 30/18036
   See application file for complete search history.

(56) References Cited

U.S. PATENT DOCUMENTS 2,050,948 A  *  8/1936   Hekking ................ B62D 13/00
                                                       116/28 R
3,944,972 A      3/1976   Chandler
(Continued)

FOREIGN PATENT DOCUMENTS

DE        3923676 A1      1/1991
DE        3931518 A1      4/1991
(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Thomas G Black
*Assistant Examiner* — Sze-Hon Kong
(74) *Attorney, Agent, or Firm* — Raymond Coppiellie; Price Heneveld LLP

(57) ABSTRACT

A trailer backup assist system for a vehicle reversing a trailer, according to one embodiment, includes a sensor that senses a hitch angle between the vehicle and the trailer. The trailer backup assist system also includes a steering input device movable between a plurality of successive positions that each provide an incremental change to a desired curvature of the trailer. In addition, the trailer backup assist system includes a controller that generates a steering command for the vehicle to guide the trailer on the desired curvature based on the sensed hitch angle and a kinematic relationship with the trailer. The incremental change is substantially equal for a population of trailers to normalize control of the desired curvature.

19 Claims, 8 Drawing Sheets

(51) Int. Cl.
  *B62D 15/02* (2006.01)
  *B60W 30/18* (2012.01)
  *B60W 10/20* (2006.01)

(52) U.S. Cl.
  CPC ......... *B62D 13/005* (2013.01); *B62D 15/027* (2013.01); *B60K 2350/102* (2013.01); *B60W 10/20* (2013.01); *B60W 2300/14* (2013.01); *B60W 2520/22* (2013.01)

(56) References Cited

U.S. PATENT DOCUMENTS

| | | | |
|---|---|---|---|
| 4,518,044 A * | 5/1985 | Wiegardt | A01B 67/00 172/3 |
| 4,848,499 A | 7/1989 | Martinet et al. | |
| 4,947,097 A | 8/1990 | Tao | |
| 5,261,495 A * | 11/1993 | Szymczak | A01B 63/1117 172/2 |
| 5,270,689 A | 12/1993 | Hermann | |
| 5,313,389 A | 5/1994 | Yasui | |
| 5,957,232 A | 9/1999 | Shimizu et al. | |
| 6,041,868 A * | 3/2000 | Matus | A01B 63/00 172/2 |
| 6,636,197 B1 | 10/2003 | Goldenberg et al. | |
| 7,038,667 B1 | 5/2006 | Vassallo et al. | |
| 7,085,634 B2 | 8/2006 | Endo et al. | |
| 7,191,865 B2 | 3/2007 | Spark | |
| 7,225,891 B2 | 6/2007 | Gehring et al. | |
| 7,255,061 B2 | 8/2007 | Denton | |
| 7,309,075 B2 | 12/2007 | Ramsey et al. | |
| 7,310,084 B2 | 12/2007 | Shitanaka et al. | |
| 7,315,299 B2 | 1/2008 | Sunda et al. | |
| 7,436,298 B2 | 10/2008 | Rajapakse et al. | |
| 7,550,686 B2 | 6/2009 | Girke et al. | |
| 7,827,917 B1 | 11/2010 | Henderson | |
| 7,837,004 B2 | 11/2010 | Yasuda | |
| 8,036,792 B2 | 10/2011 | Dechamp | |
| 8,138,865 B2 | 3/2012 | North et al. | |
| 8,519,948 B2 | 8/2013 | Cruz-Hernandez et al. | |
| 8,755,984 B2 | 6/2014 | Rupp et al. | |
| 8,786,417 B2 | 7/2014 | Holmen et al. | |
| 8,930,140 B2 | 1/2015 | Trombley et al. | |
| 9,315,212 B1 | 4/2016 | Kyrtsos et al. | |
| 9,335,162 B2 | 5/2016 | Kyrtsos et al. | |
| 9,340,228 B2 | 5/2016 | Xu et al. | |
| 2004/0093139 A1 | 5/2004 | Wildey et al. | |
| 2004/0189595 A1 | 9/2004 | Yuasa et al. | |
| 2004/0195013 A1* | 10/2004 | Spark | B60L 15/2036 180/6.24 |
| 2005/0000738 A1* | 1/2005 | Gehring | B62D 15/0285 180/14.1 |
| 2005/0055138 A1* | 3/2005 | Lee | G05D 1/0891 701/1 |
| 2006/0092129 A1 | 5/2006 | Choquet et al. | |
| 2007/0198190 A1 | 8/2007 | Bauer et al. | |
| 2008/0030361 A1 | 2/2008 | Peissner et al. | |
| 2008/0312792 A1 | 12/2008 | Dechamp | |
| 2009/0101429 A1 | 4/2009 | Williams | |
| 2009/0306854 A1* | 12/2009 | Dechamp | B62D 13/06 701/41 |
| 2010/0063670 A1 | 3/2010 | Brzezinski et al. | |
| 2010/0152989 A1 | 6/2010 | Smith et al. | |
| 2010/0222964 A1* | 9/2010 | Dechamp | B62D 15/027 701/41 |
| 2011/0149077 A1 | 6/2011 | Robert | |
| 2011/0160956 A1 | 6/2011 | Chung et al. | |
| 2012/0030626 A1 | 2/2012 | Hopkins et al. | |
| 2012/0087480 A1 | 4/2012 | Yang et al. | |
| 2012/0271512 A1 | 10/2012 | Rupp et al. | |
| 2012/0271514 A1 | 10/2012 | Lavoie et al. | |
| 2012/0271515 A1 | 10/2012 | Rhode et al. | |
| 2013/0006472 A1 | 1/2013 | McClain et al. | |
| 2013/0024064 A1* | 1/2013 | Shepard | B62D 13/06 701/23 |
| 2013/0158803 A1 | 6/2013 | Headley | |
| 2013/0158863 A1* | 6/2013 | Skvarce | G08G 1/168 701/428 |
| 2013/0179038 A1* | 7/2013 | Goswami | B62D 13/005 701/42 |
| 2013/0268160 A1 | 10/2013 | Trombley et al. | |
| 2014/0052337 A1 | 2/2014 | Lavoie et al. | |
| 2014/0058344 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0085472 A1* | 3/2014 | Lu | B60R 1/002 348/148 |
| 2014/0088797 A1 | 3/2014 | McClain et al. | |
| 2014/0136052 A1* | 5/2014 | Kossira | B60D 1/06 701/41 |
| 2014/0156148 A1 | 6/2014 | Kikuchi | |
| 2014/0160276 A1* | 6/2014 | Pliefke | B60R 1/00 348/118 |
| 2014/0172232 A1 | 6/2014 | Rupp et al. | |
| 2014/0188344 A1 | 7/2014 | Lavoie | |
| 2014/0188346 A1 | 7/2014 | Lavoie | |
| 2014/0200759 A1* | 7/2014 | Lu | B60D 1/245 701/28 |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0267868 A1 | 9/2014 | Mazzola et al. | |
| 2014/0267869 A1 | 9/2014 | Sawa | |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0379217 A1 | 12/2014 | Rupp et al. | |
| 2015/0057903 A1 | 2/2015 | Rhode et al. | |
| 2015/0066296 A1 | 3/2015 | Trombley et al. | |
| 2015/0070161 A1* | 3/2015 | Mizuno | B60Q 1/40 340/465 |
| 2015/0120141 A1 | 4/2015 | Lavoie et al. | |
| 2015/0134183 A1 | 5/2015 | Lavoie et al. | |
| 2015/0138340 A1 | 5/2015 | Lavoie | |
| 2015/0158527 A1 | 6/2015 | Hafner et al. | |
| 2015/0203156 A1 | 7/2015 | Hafner et al. | |
| 2015/0210317 A1 | 7/2015 | Hafner et al. | |
| 2015/0217693 A1* | 8/2015 | Pliefke | B60R 1/00 348/118 |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 | 8/2009 |
| DE | 102009012253 A1 | 9/2010 |
| DE | 102010021052 A1 | 11/2011 |
| DE | 102010029184 A1 | 11/2011 |
| EP | 0418653 A1 | 3/1991 |
| EP | 1810913 A1 | 7/2007 |
| EP | 2388180 A2 | 11/2011 |
| EP | 1569073 B1 | 9/2014 |
| GB | 2398048 A | 8/2004 |
| GB | 2398049 A | 8/2004 |
| GB | 2398050 A | 8/2004 |
| JP | 2003045269 A | 2/2003 |
| JP | 2003175852 A | 6/2003 |
| JP | 2007186118 A | 7/2007 |
| KR | 20140105199 A | 9/2014 |
| WO | 0044605 A1 | 8/2000 |

* cited by examiner

TRAILER BACKUP ASSIST SYSTEM WITH NORMALIZED STEERING INPUT DEVICE FOR DIFFERENT TRAILERS

CROSS-REFERENCE TO RELATED APPLICATION

This patent application is a continuation-in-part of U.S. patent application Ser. No. 13/336,042, which was filed on Dec. 23, 2011, entitled "ROTATABLE DRIVER INTERFACE FOR TRAILER BACKUP ASSIST," now issued as U.S. Pat. No. 8,972,109, which claims benefit to U.S. Provisional Patent Application No. 61/477,136, which was filed Apr. 19, 2011, entitled "INTUITIVE DRIVER INTERFACE FOR TRAILER REVERSE ASSIST," and are hereby incorporated by reference in their entirety.

FIELD OF THE INVENTION

The disclosure made herein relates generally to driver assist and active safety technologies in vehicles, and more particularly to a trailer backup assist system that is configured with a normalized steering input device for guidance of different trailers.

BACKGROUND OF THE INVENTION

Reversing a vehicle while towing a trailer can be challenging for many drivers, particularly for drivers that drive with a trailer on an infrequent basis or with various types of trailers. One reason for such difficulty may be that backing a vehicle with an attached trailer requires steering inputs that are opposite to steering inputs when backing the vehicle without a trailer attached to the vehicle. Another reason for such difficulty may be that small errors in steering while backing a vehicle with an attached trailer are amplified, which may cause the trailer to quickly depart from a desired path. Yet an additional reason backing a trailer can prove to be difficult is the need to control the vehicle in a manner that limits the potential for a jackknife condition to occur. These difficulties may also be experienced and in some instances increased when attempting to quickly achieve a tight turning radius or when switching between various trailers that have a wide variance in how they react to similar steering inputs, such as how a relatively short trailer may react quicker to a steering change than a longer trailer.

SUMMARY OF THE INVENTION

According to one aspect of the present invention, a trailer backup assist system for a vehicle reversing a trailer includes a knob rotatable to a plurality of positions that each define a desired curvature. The trailer backup assist system also includes a controller that generates a steering command for the vehicle to guide the trailer on the desired curvature based on a kinematic relationship between the vehicle and the trailer. The desired curvature for each of the plurality of positions is defined based on normalized trailer dimensions.

According to another aspect of the present invention, a trailer backup assist system for a vehicle reversing a trailer includes a hitch sensor that senses a hitch angle between the vehicle and the trailer. The trailer backup assist system also includes a steering input device that is operable between a plurality of selections that each provide an incremental change to a desired curvature of the trailer. Further, the trailer backup assist system includes a controller that generates a steering command for the vehicle to guide the trailer on the desired curvature based on the sensed hitch angle and a kinematic relationship with the trailer. The incremental change is substantially equal for a population of trailers to normalize control of the desired curvature.

According to a further aspect of the present invention, a method for steering a vehicle reversing a trailer provides dimensions for a population of trailers reversible by the vehicle. The method also provides a rotatable knob. Further, the method determines a desired curvature for the trailer based on a position of the rotatable knob, wherein change of the desired curvature is a function of a normalized ratio based on degrees of change in the position of the rotatable knob and the dimensions of the population of trailers.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
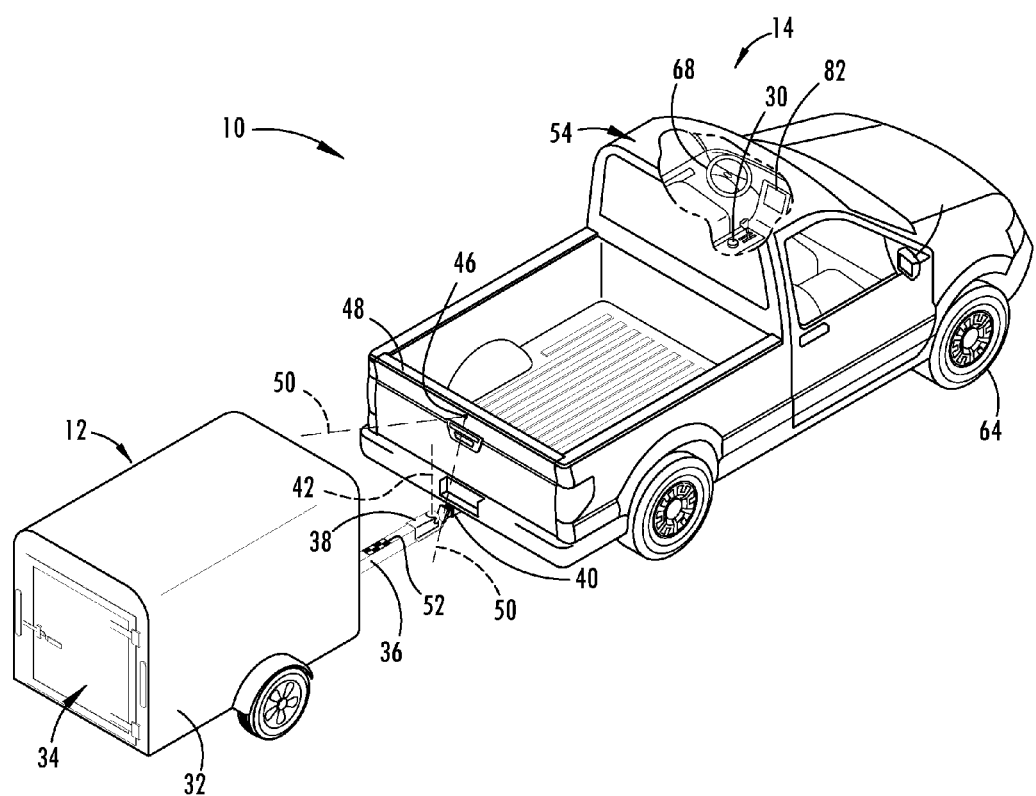
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-11, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature 26 as a driver uses the accelerator and brake pedals to control the reversing speed of the vehicle 14. In some embodiments, the trailer 12 may be one of a number of trailers that are capable of being attached to the vehicle 14, such that a population of additional trailers may be defined by trailers capable of being towed by the vehicle 14 or by trailers previously attached to the vehicle 14 and reversed with guidance by the trailer backup assist system 10, among other alternatively defined populations of additional trailers. To monitor the position of the attached trailer 12 relative to the vehicle 14, the trailer backup assist system 10 may include a sensor system 16 that senses a hitch angle γ between the trailer 12 and the vehicle 14, which may be referred to as a hitch angle sensor 44. In addition, the trailer backup assist system 10 may include a steering input device 18, such as a rotatable knob 30, for a driver to provide the desired curvature 26 of the trailer 12. As such, the steering input device 18 may be operable between a plurality of selections, such as successive rotated positions of the knob 30, that each provide an incremental change to the desired curvature 26 of the trailer 12. Upon inputting the desired curvature 26, a controller may then generate a steering command for the vehicle 14 to guide the trailer 12 on the desired curvature 26 based on the sensed hitch angle γ and a kinematic relationship between the trailer 12 and the vehicle 14. The incremental change to the desired curvature 26 of the trailer 12 may then be configured to be substantially equal for the population of trailers, thereby normalizing control of the desired curvature 26, according to one embodiment.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes a vision-based hitch angle sensor 44 for sensing the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, a yaw rate sensor on the trailer 12 and the vehicle 14, energy transducers of a reverse aid system, a blind spot system, and/or a cross traffic alert system, and other conceivable sensors or indicators of the hitch angle γ to supplement or be used in place of the vision based hitch angle sensor 44.

Figure 2:
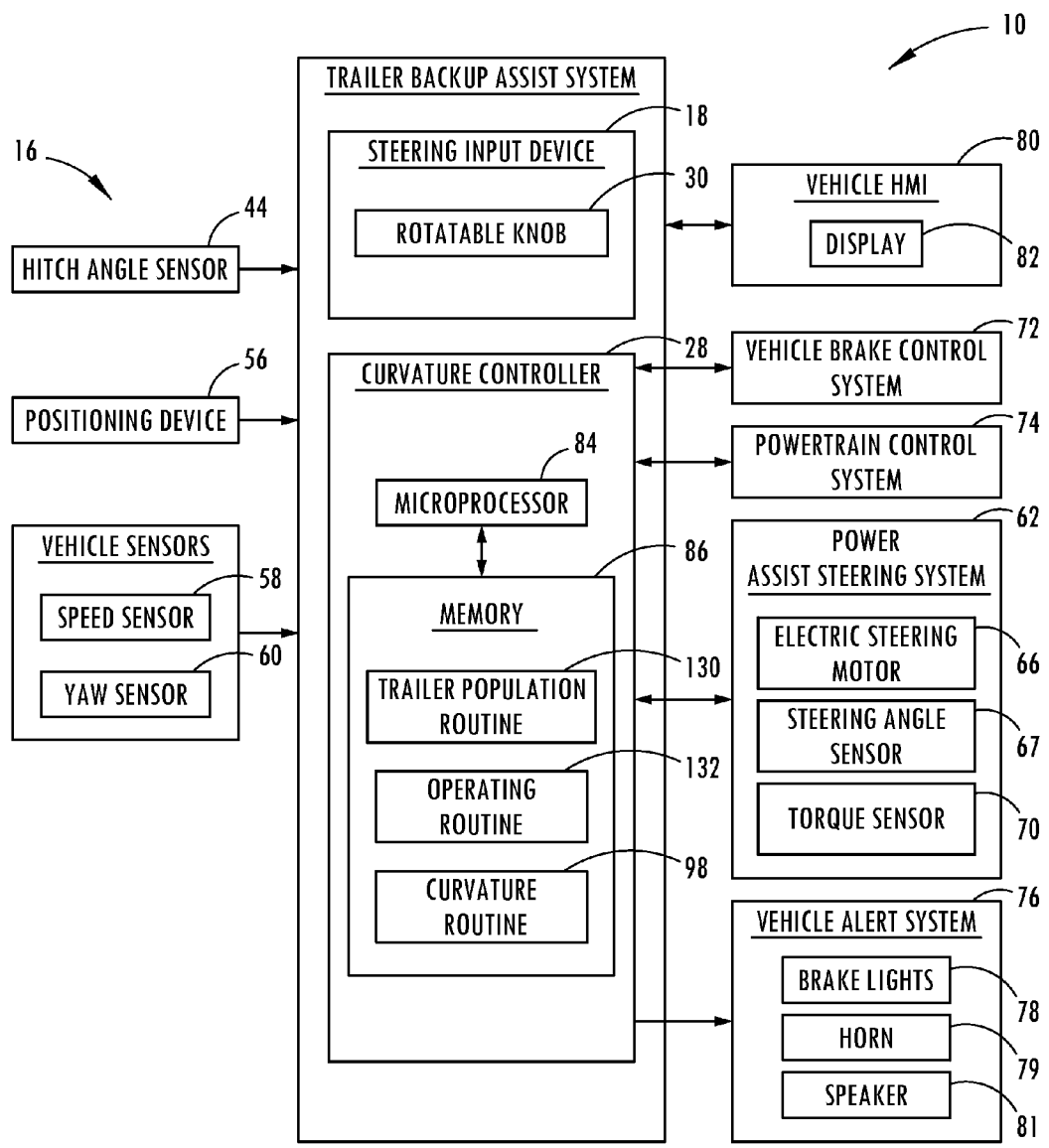
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 provides the sensed hitch angle γ to the trailer backup assist system 10. Similarly, the illustrated embodiment of the trailer backup assist system 10 receives vehicle status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the sensed hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw sensor 60. It is contemplated that in additional embodiments, the hitch angle sensor 44 and other vehicle sensors and devices may provide sensor signals or other information, such as proximity sensor signals or successive images of the trailer 12, that a controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the curvature controller 28 of the trailer backup assist system 10 with information relating to a rotational position of steered wheels 64 of the vehicle 14, including a steering angle. The curvature controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the curvature controller 28 to provide the trailer backup assist system 10 with braking information, such as wheel speed, and to receive braking commands from the curvature controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the yaw sensor 60, for use in determining the vehicle steering commands. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and the target location within a desired target placement zone on display. In addition, the portable device may provide feedback information, such as visual, audible, and tactile alerts.

As further illustrated in FIG. 2, the trailer backup assist system 10 includes a steering input device 18 that is connected to the curvature controller 28 for allowing communication of information therebetween. It is disclosed herein that the steering input device 18 can be coupled to the curvature controller 28 in a wired or wireless manner. The steering input device 18 provides the trailer backup assist system 10 with information defining the desired backing path of travel of the trailer 12 for the curvature controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the curvature controller 28 is configured with a microprocessor 84 to process logic and routines stored in memory 86 that receive information from the steering input device 18, the hitch angle sensor 44, the power assist steering system 62, the vehicle brake control system 72, the trailer braking system, the powertrain control system 74, and other vehicle sensors and devices. The curvature controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The curvature controller 28 may include the microprocessor 84 and/or other analog and/or digital circuitry for processing one or more routines. Also, the curvature controller 28 may include the memory 86 for storing one or more routines, including an operating routine 132, a trailer population routine 130, and a curvature routine 98. It should be appreciated that the curvature controller 28 may be a stand-alone dedicated controller or may be a shared controller integrated with other control functions, such as integrated with the sensor system 16, the power assist steering system 62, and other conceivable onboard or off-board vehicle control systems.

Figure 3:
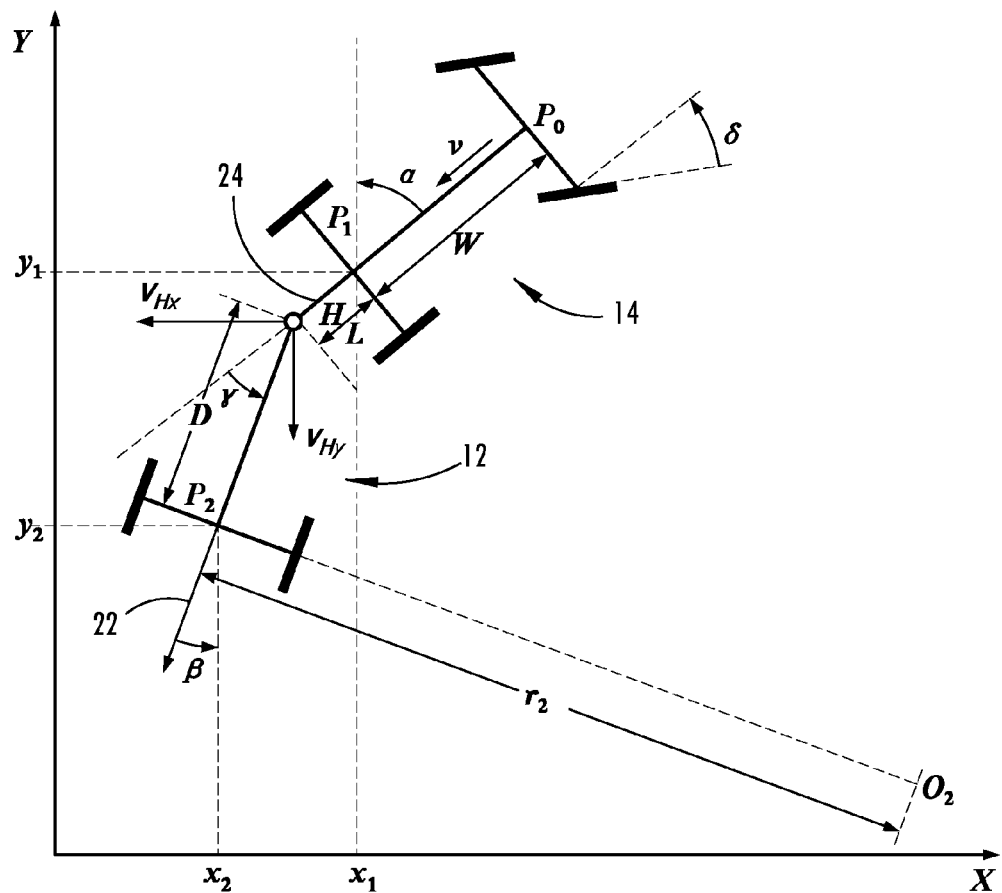
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the curvature controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

$\delta$: steering angle at steered front wheels of the vehicle;

$\alpha$: yaw angle of the vehicle;

$\beta$: yaw angle of the trailer;

$\gamma$: hitch angle ($\gamma = \beta - \alpha$);

W: wheel base of the vehicle;

L: length between hitch point and rear axle of the vehicle;

D: distance between hitch point and axle of the trailer or effective axle for a multiple axle trailer (axle length may be an equivalent); and $r_2$: curvature radius for the trailer.

One embodiment of a kinematic relationship between trailer path radius of curvature $r_2$ at the midpoint of an axle of the trailer 12, steering angle $\delta$ of the steered wheels 64 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle $\delta$ as a function of trailer path curvature $\kappa_2$ and hitch angle $\gamma$.

$$\delta = \tan^{-1}\left(\frac{\left(W + \frac{KV^2}{g}\right)[\kappa_2 D \cos\gamma - \sin\gamma]}{DL\kappa_2 \sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the curvature controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
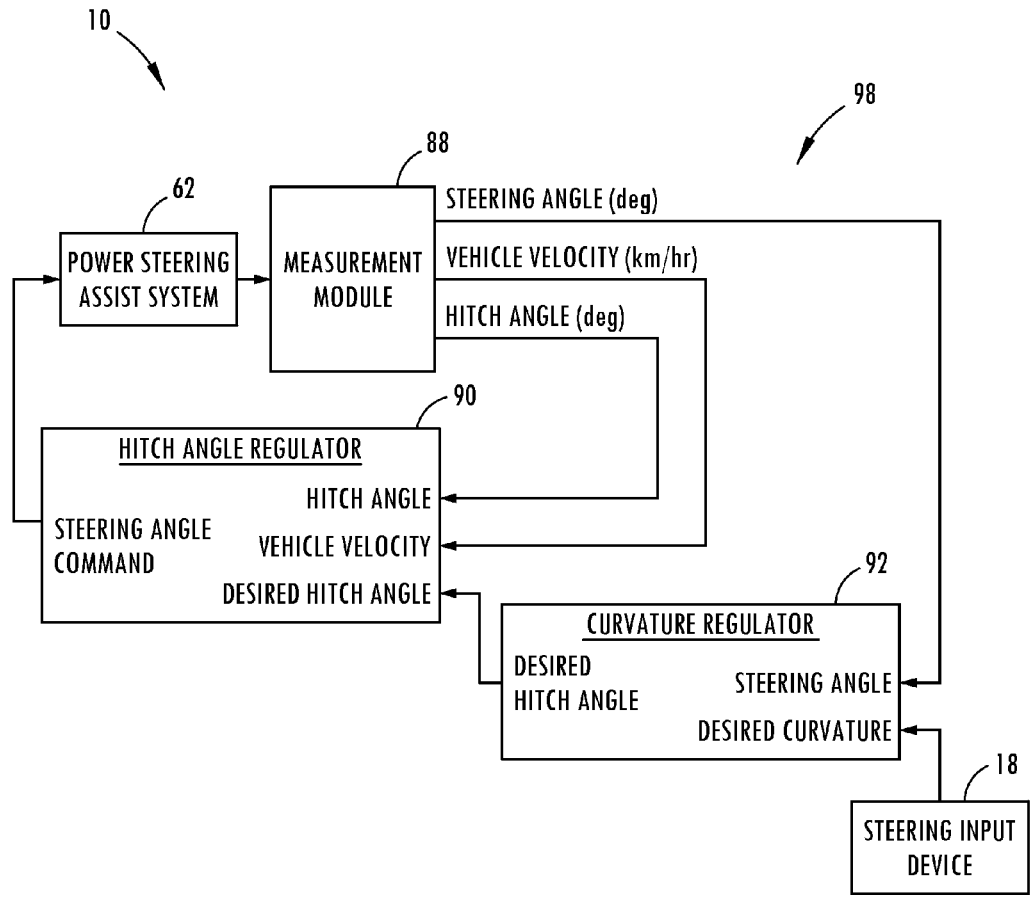
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the curvature controller 28. In the illustrated layout, the steering input device 18 provides a desired curvature $\kappa_2$ value to the curvature regulator 92 of the curvature controller 28, which may be determined from the desired backing path 26 that is input with the steering input device 18. The curvature regulator 92 computes a desired hitch angle $\gamma(d)$ based on the current desired curvature $\kappa_2$ along with the steering angle $\delta$ provided by a measurement module 88 in this embodiment of the curvature controller 28. The measurement module 88 may be a memory device separate from or integrated with the curvature controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle $\gamma(d)$ is computed by the curvature regulator 92 the hitch angle regulator 90 generates a steering angle command based on the computed desired hitch angle $\gamma(d)$ as well as a measured hitch angle $\gamma(m)$ and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 5:
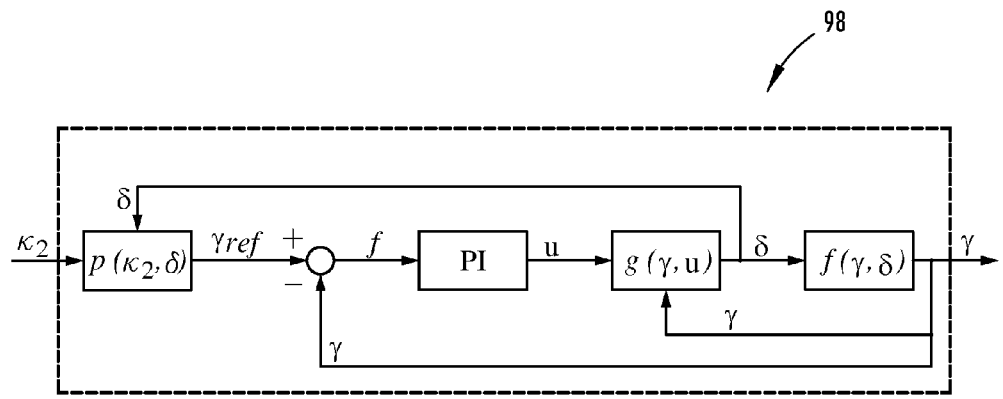
FIG. 5 is schematic block diagram of the curvature controller of FIG. 4, showing the feedback architecture and signal flow of the curvature controller, according to such an embodiment.

As also shown in FIG. 5, the embodiment of the curvature routine 98 shown in FIG. 4 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where,
$\kappa_2$ represents the desired curvature of the trailer 12 or $1/r_2$ as shown in FIG. 3;
$\delta$ represents the steering angle;
L represents the distance from the rear axle of the vehicle 14 to the hitch pivot point;
D represents the distance from the hitch pivot point to the axle of the trailer 12; and
W represents the distance from the rear axle to the front axle of the vehicle 14.

With further reference to FIG. 5, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, $g(u, \gamma, v)$, is implemented with a proportional integral (PI) controller, whereby the integral portion substantially eliminates steady-state tracking error. More specifically, the control system illustrated in FIG. 5B may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\delta$$

-continued $$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Figure 6:
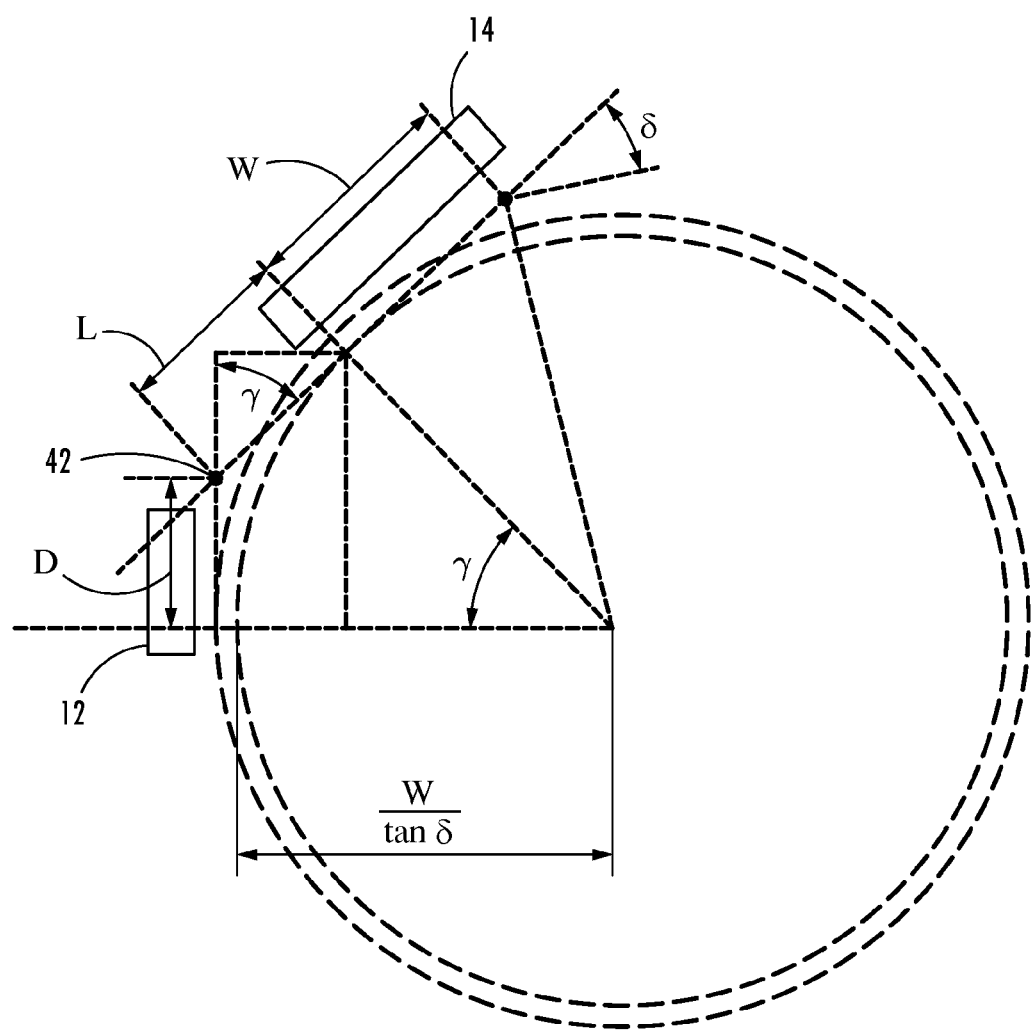
FIG. 6 is a schematic diagram showing a relationship between a hitch angle and a steering angle of the vehicle as it relates to curvature of the trailer and a jackknife angle.

Referring now to FIG. 6, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle γ(j) refers to a hitch angle γ that while backing cannot be overcome by the maximum steering input for a vehicle such as, for example, the steered front wheels of the vehicle 14 being moved to a maximum steered angle δ at a maximum rate of steering angle change. The jackknife angle γ(j) is a function of a maximum wheel angle for the steered wheels of the vehicle 14, the wheel base W of the vehicle 14, the distance L between hitch point and the rear axle of the vehicle 14, and the length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can be used to determine a jackknife angle for the vehicle-trailer combination. Accordingly, with reference to FIGS. 3 and 6, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max). The steering angle for circular motion with hitch angle γ is defined by the following equation.

$$\tan \delta_{max} = \frac{w \sin \gamma_{max}}{D + L \cos \gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos \bar{\gamma} = \frac{-b \pm \sqrt{b^2 - 4ac}}{2a}$$

where,
$a = L^2 \tan^2 \delta(max) + W^2$;
$b = 2 LD \tan^2 \delta(max)$; and
$c = D^2 \tan^2 \delta(max) - W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the curvature controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing a hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 7:
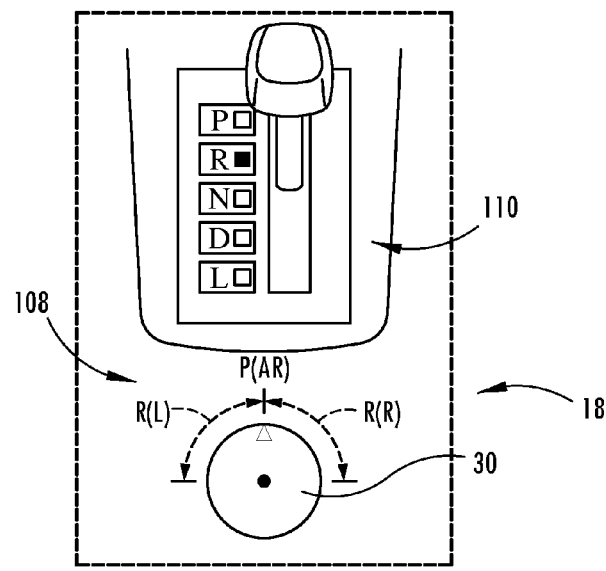
FIG. 7 is a plan view of a steering input device having a rotatable knob for operating the trailer backup assist system, according to one embodiment.

Referring now to FIG. 7, one embodiment of the steering input device 18 is illustrated disposed on a center console 108 of the vehicle 14 proximate a shifter 110. In this embodiment, the steering input device 18 includes a rotatable knob 30 for providing the curvature controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 8:
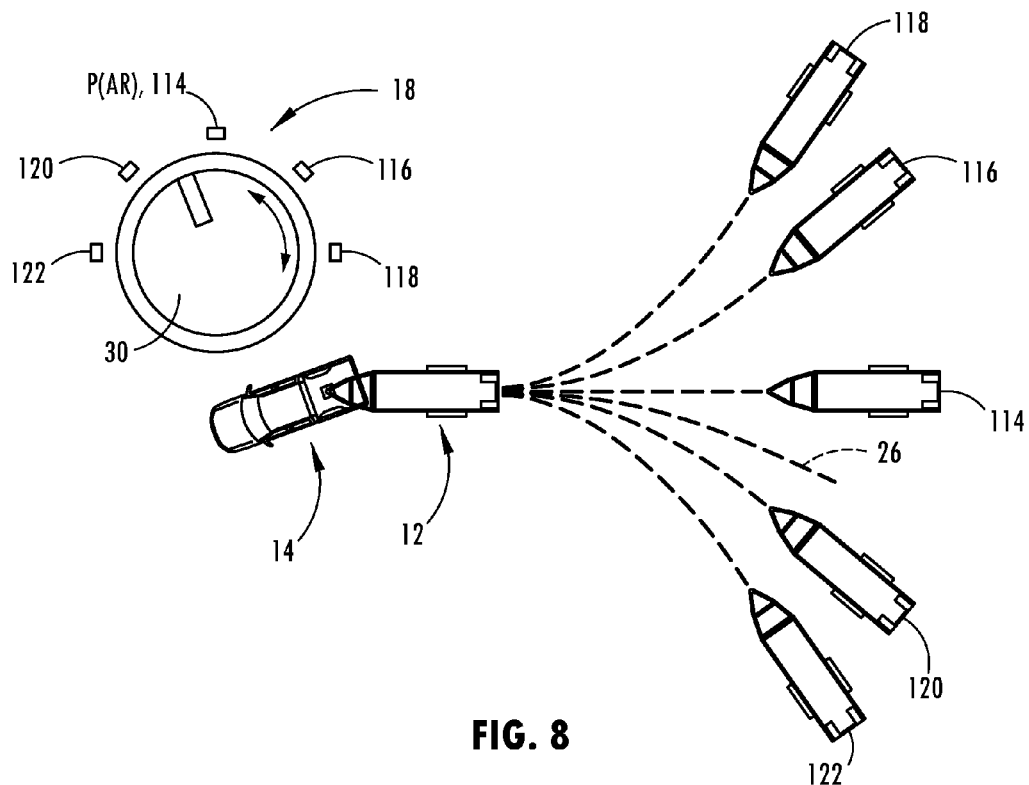
FIG. 8 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 7-8, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops).

With further reference to FIGS. 7-8, the rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the curvature controller 28. As will be discussed below in greater detail, the at-rest position P(AR) of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition. In this regard, the at-rest position P(AR) is a zero curvature commanding position with respect to the opposing rotational ranges of motion R(R), R(L). Accordingly, a ratio of a commanded curvature of a path of a trailer 12 (e.g., radius of a desired backing path) and a corresponding amount of rotation of the knob 30 can vary over each one of the opposing rotational ranges of motion R(L), R(R) of the knob. As such, it is also contemplated the ratio may be normalized based on degrees of change in the position of the knob 30 and dimensions of a population of trailers, so the knob 30 may provide substantially equal desired curvature output for various trailers and by the driver. It is also contemplated that the ratio can additionally or alternatively be a function of vehicle speed, trailer geometry, vehicle geometry, hitch geometry and/or trailer load.

FIG. 8 shows an example of a trailer path curvature function plot for a steering input device 18 with a degree of rotation of the rotatable knob 30 correlating with the desired curvature of the trailer path. According to one embodiment, a ratio between the desired curvature relative to user input (e.g., amount of rotation) at the rotatable knob may be defined by a cubic function. However, it will appreciated that embodiments of the disclosed subject matter are not limited to any particular function between a magnitude and/or rate of input at a steering input device 18 (e.g., knob rotation) and a resulting desired curvature value, including with the implementation of a normalized ratio, as described in great detail herein. The desired curvature of the trailer 12 as commanded by the steering input device 18 and the trailer backup assist system 10 is also described in greater detail below.

Figure 9:
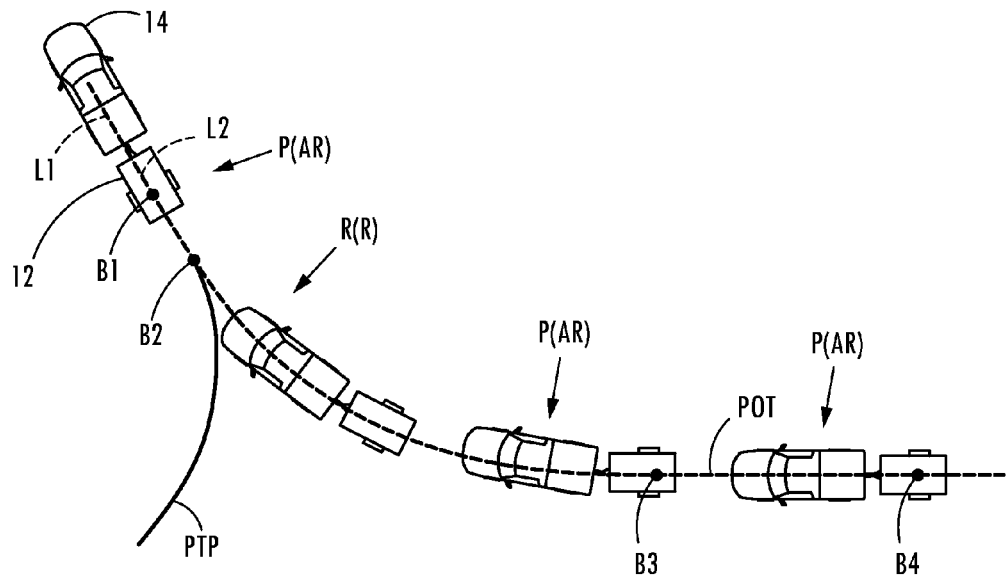
FIG. 9 is a schematic diagram showing a backup sequence of a vehicle and a trailer implementing various curvature selections with the trailer backup assist system, according to one embodiment.

Referring to FIGS. 8-9, as a driver of the vehicle 14 backs the trailer 12, the driver can turn the rotatable knob 30 to provide a desired curvature 26. According to the embodiment shown in FIG. 8, the steering input device 18 is embodied as a rotatable knob 30 for allowing the driver of the vehicle 14 to command a desired backing path by indicting a desired curvature 26. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

According to some embodiments, the rotatable knob 30 or other steering input device 18 may be configured to provide a tactile feedback signal (e.g., a vibration through the knob) as a warning if any one of a variety of conditions occur. For instance, conditions to prompt a tactile feedback signal may include the trailer 12 approaching a jackknife angle, the vehicle or the trailer approaching an object, the trailer backup assist system 10 having a failure, the trailer backup assist system 10 detecting a fault, the trailer backup assist system 10 or other system of the vehicle 14 has predicted a collision on the present path of travel of the trailer 12, the trailer backup system has restricted a commanded curvature or reduced the available backing paths (e.g., due to excessive speed of the vehicle 14 or due to the proximity of an object in the perimeter field), and the like. Still further, it is conceivable that the steering input device 18 can use illumination and/or an audible signal output (e.g. speaker) to provide certain feedback information or warnings.

Referring again to FIG. 9, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 9, in order to activate the trailer backup assist system 10, the driver interacts with the trailer backup assist system 10 and the automatically steers as the driver reverses the vehicle 14. As discussed above, the driver may command the trailer backing path by using a steering input device 18 and the curvature controller 28 may determine the vehicle steering angle to achieve the desired curvature 26, whereby the driver controls the throttle and brake while the trailer backup assist system 10 controls the steering.

Figure 10:
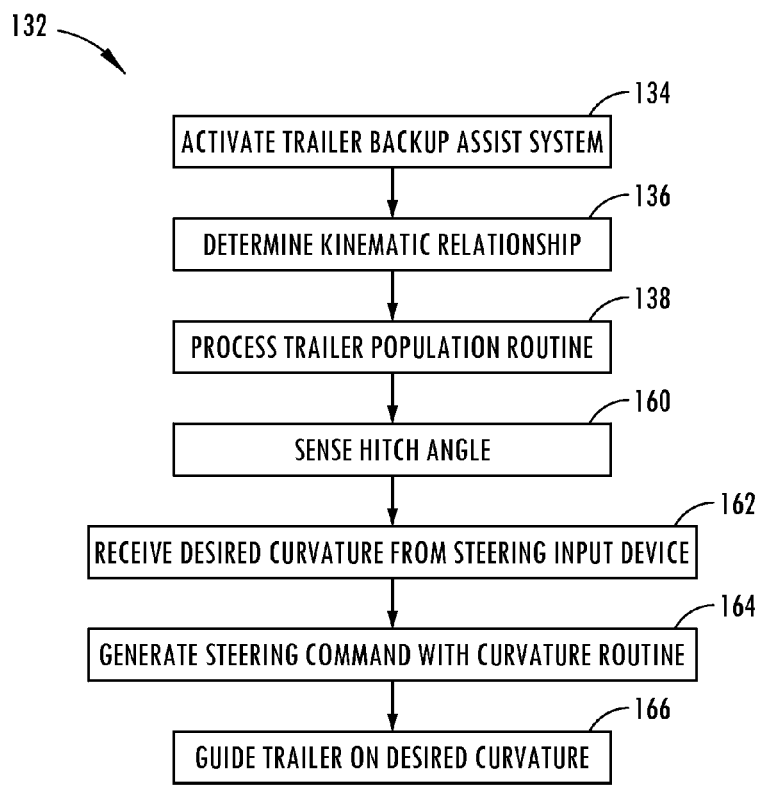
FIG. 10 is a flow diagram illustrating a method of operating a trailer backup assist system using an operating routine for steering a vehicle reversing a trailer with normalized control of the desired curvature, according to one embodiment.

With reference to FIG. 10, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such a making a selection on the display 82 of the vehicle HMI 80. The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 138 to process the trailer population routine 130.

Figure 11:
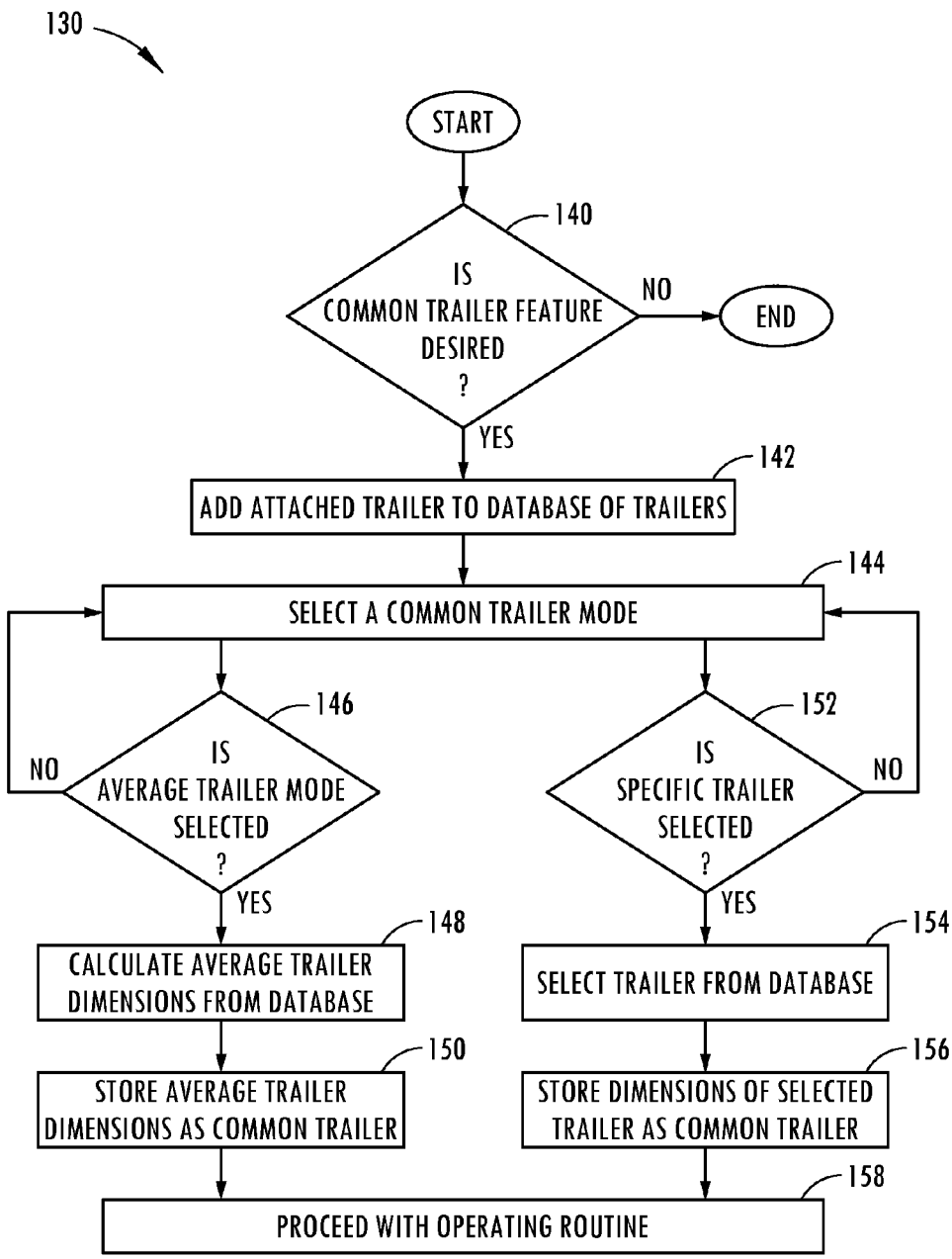
FIG. 11 is a flow diagram illustrating a method of operating a trailer backup assist system using a trailer population routine, according to one embodiment.

As shown in FIG. 11, one embodiment of the trailer population routine 130 is illustrated. The first determination of the illustrated trailer population routine 130 is at step 140, where it is determined whether a common trailer feature is desired. The common trailer feature may allow the curvature controller 28 to generate normalized steering commands that make the attached trailer 12 behave in response to inputs by the steering input device 18 in substantially the same manner as a common trailer, as defined by the trailer population routine 130. If the common trailer feature is not desired, the trailer population routine 130 ends and the operating routine 132 proceeds. Otherwise, the attached trailer 12 is added to a stored database of trailers at step 142. The stored database of trailers may be a database of the trailers previously attached to the vehicle 14, trailers previously attached to the vehicle 14 that have been reversed with the trailer backup assist system 10, trailers capable of being attached to the vehicle 14, and other conceivable groupings of trailers. For instance, the vehicle manufacturer may provide the database with a grouping of the most common trailers attached to the particular type of vehicle provided with the trailer backup assist system 10.

At step 144 of the trailer population routine 130 illustrated in FIG. 11, the driver is prompted to select a common trailer mode, such as on the display 82 of the vehicle HMI 80. The illustrated trailer population routine 130 sets forth an average trailer mode and a specific trailer mode for potential selection, although it is understood that more or fewer common trailer modes may be selected. If it is determined at step 146 that the average trailer mode is selected, the routine 130 calculates the average trailer dimensions from the database of trailers at step 148. With the average trailer dimensions, at step 150, the common trailer is defined with the average or otherwise normalized trailer dimensions for use in generating speed commands and steering commands for the vehicle, such that inputs or changes to the desired curvature 26 with the steering input device 18 are substantially equal across the population of trailers stored in the database. More specifically, the dimensions of the common trailer may be used to define a normalized ratio based on selections or movements of the steering input device 18 to provide an incremental change to the desired curvature 26 that is equal or substantially equal for the population of trailers. Otherwise, if it is determined at step 152 that the specific trailer mode is selected, the routine 130 prompts the driver to select a trailer from the database that the driver desires to be the common trailer at step 154. It is also contemplated that the driver may alternatively input dimensions to be used as the common trailer. At step 156, the dimensions of the selected trailer are again stored to define the common trailer for use in determining what the incremental change in the desired curvature 26 will correspond to the change in selection or movement of the steering input device 18, such as the change in degrees of the rotational angle of the rotatable knob 30. Upon storing dimensions of the common trailer variable, the operating routine 132 resumes at step 158.

Referring again to FIG. 10, at step 160 the hitch angle γ is sensed between the vehicle 14 and the trailer 12, although this may be done continuously during operation of the trailer backup assist system 10. It is contemplated that in additional embodiments of the trailer backup assist system 10 that the steps of determining the kinematic relationship and sensing the hitch angle γ may occur before the trailer backup assist system 10 is activated or at any other time before steering commands are generated. Accordingly, at step 162, the position and rate of changes is received from the steering input device 18, such as the angular position and rate of rotation of the rotatable knob 30, for determining the desired curvature 26 in accordance with the common trailer, if selected. If a common trailer is selected, steering commands may be generate at step 164 based on the desired curvature, as determined from the normalized values and rate correlating with the position and rate of change of the steering input device 18. The steering commands and actuation commands generated may be generated in conjunction with processing of the curvature routine 98, as previous discussed. At step 166, the steering commands and actuation commands have been executed to guide the trailer 12 on the desired curvature provided by the steering input device 18, as normalized by the operating routine 132, if desired.

In parallel with performing the operations for receiving the trailer backup assist requests, determining the desired curvature 26 of the trailer 12, and generating the vehicle steering commands, the trailer backup assist system 10 may perform an operation for monitoring if an unacceptable trailer backup condition exists. Examples of such monitoring include, but are not limited to assessing a hitch angle γ to determine if a hitch angle γ threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from the wheel speed information obtained from one or more wheel speed sensors 58 of the vehicle 14. If it is determined that an unacceptable trailer backup condition exists, an operation may be performed for causing the current path of travel of the trailer 12 to be inhibited (e.g., stopping motion of the vehicle 14), followed by the operation being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations. Otherwise, the method can proceed to operation for ending the current trailer backup assist instance. In conjunction with performing the operation for ending the current trailer backup assist instance, an operation can be performed for controlling movement of the vehicle 14 to correct or limit a jackknife condition (e.g., steering the vehicle 14, decelerating the vehicle 14, limiting magnitude and/or rate of driver requested trailer curvature input, limiting magnitude and/or rate of the steering command, and/or the like to preclude the hitch angle from being exceeded).

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A trailer backup assist system for a vehicle reversing a trailer, comprising:
    a knob rotatable to a plurality of positions that each define a desired curvature; and
    a controller generating a steering command for the vehicle to guide the trailer on the desired curvature based on a kinematic relationship between the vehicle and the trailer, wherein the desired curvature for each of the plurality of positions is defined based on normalized trailer lengths for a plurality of trailers, wherein the normalized trailer lengths include lengths of trailers previously attached to the vehicle and reversed with guidance by the trailer backup assist system.

2. The trailer backup assist system of claim 1, further comprising:
    a hitch angle sensor for sensing a hitch angle between the trailer and the vehicle, wherein the steering command is generated based on the sensed hitch angle.

3. The trailer backup assist system of claim 1, wherein the kinematic relationship is determined based on a length of the trailer, a wheel base of the vehicle, and a distance between a hitch point and a rear axle of the vehicle.

4. The trailer backup assist system of claim 1, wherein the normalized trailer lengths include lengths of additional trailers capable of being towed by the vehicle.

5. The trailer backup assist system of claim 1, wherein the knob is rotatable in opposing directions from a center position to opposing rotational end positions, whereby the center position defines the desired curvature as zero.

6. The trailer backup assist system of claim 5, wherein the opposing rotational end positions are defined by the smallest radius of curvature controllable across a population of additional trailers.

7. A trailer backup assist system for a vehicle reversing a trailer, comprising:
    a hitch sensor sensing a hitch angle between the vehicle and the trailer;
    a steering input device operable between a plurality of selections that each provide an incremental change to a desired curvature of the trailer; and
    a controller generating a steering command for the vehicle to guide the trailer on the desired curvature based on the sensed hitch angle and a kinematic relationship with the trailer, wherein the incremental change is equal for a population of trailers having different dimensions to normalize control of the desired curvature.

8. The trailer backup assist system of claim 7, wherein the population of trailers includes a set of additional trailers capable of being towed by the vehicle.

9. The trailer backup assist system of claim 7, wherein the population of trailers includes trailers previously attached to the vehicle and reversed with guidance by the trailer backup assist system.

10. The trailer backup assist system of claim 9, wherein the incremental change of the desired curvature is determined based on an average length of the population of trailers.

11. The trailer backup assist system of claim 9, wherein the steering input device includes a knob rotatable between a first position and a second position, such that the incremental change to the desired curvature is defined as a function of degrees of rotation of the knob between the first and second positions.

12. The trailer backup assist system of claim 7, wherein the steering input device is moveable between a plurality of successive positions that each provide the incremental change to the desired curvature.

13. The trailer backup assist system of claim 7, wherein the steering input device includes a knob rotatable in opposing directions from a center position to opposing rotational end positions, whereby the center position defines the desired curvature as zero.

14. The trailer backup assist system of claim 13, wherein the opposing rotational end positions are defined by the smallest radius of curvature controllable across the population of trailers.

15. A method for steering a vehicle reversing a trailer, comprising:
    providing lengths for a population of trailers reversible by the vehicle;
    providing a rotatable knob; and
    determining a desired curvature for the trailer based on a position of the rotatable knob, wherein change to the desired curvature is a function of a normalized ratio based on degrees of change in the position and the lengths of the population of trailers, wherein the desired curvature is determined based on a kinematic relationship between the vehicle and the trailer, and wherein the normalized ratio for changes to the desired curvature is determined based on an average length of the population of trailers.

16. The method of claim 15, further comprising:
    sensing a hitch angle between the vehicle and the trailer attached to the vehicle; and
    generating a steering command for the vehicle to guide the trailer on the desired curvature based on the hitch angle.

17. The method of claim 16, wherein the population of trailers includes a set of trailers previously attached to the vehicle and reversed with guidance by the desired curvature.

18. The method of claim 16, wherein the rotatable knob is rotatable in opposing directions from a center position to opposing rotational end positions, whereby the center position defines the desired curvature as zero and the opposing rotational end positions are defined by the smallest radius of curvature controllable across the population of trailers.

19. A vehicle trailer backup assist system comprising:
    a steering input device actuatable to a plurality of positions that each define a desired steering input; and
    a controller generating a steering command for a vehicle to guide a trailer on a steering path based on the steering input device, wherein the desired steering input for each of the plurality of positions is defined based on normalized trailer lengths for a plurality of trailers, wherein each incremental change for each position of the steering input device is equal for the plurality of trailers that have different dimensions.

* * * * *

UNITED STATES PATENT AND TRADEMARK OFFICE
CERTIFICATE OF CORRECTION

Page 1 of 1

PATENT NO. : 9,505,434 B2
APPLICATION NO. : 14/447102
DATED : November 29, 2016
INVENTOR(S) : Erick Michael Lavoie et al.

It is certified that error appears in the above-identified patent and that said Letters Patent is hereby corrected as shown below:

On the Title Page
Related U.S. Application Data:
"(63) Continuation-in-part of application No. 13/336,042, filed on Dec. 23, 2011, now U.S. Pat. No. 8,972,108." should be --(63) Continuation-in-part of application No. 13/336,042, filed on Dec. 23, 2011, now Pat. No. 8,897,109.--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*